Feb. 16, 1971 J. O. W. MARTIN 3,562,947
FISHING POLE SUPPORT AND HOOK-SETTING APPARATUS
Filed Dec. 3, 1968
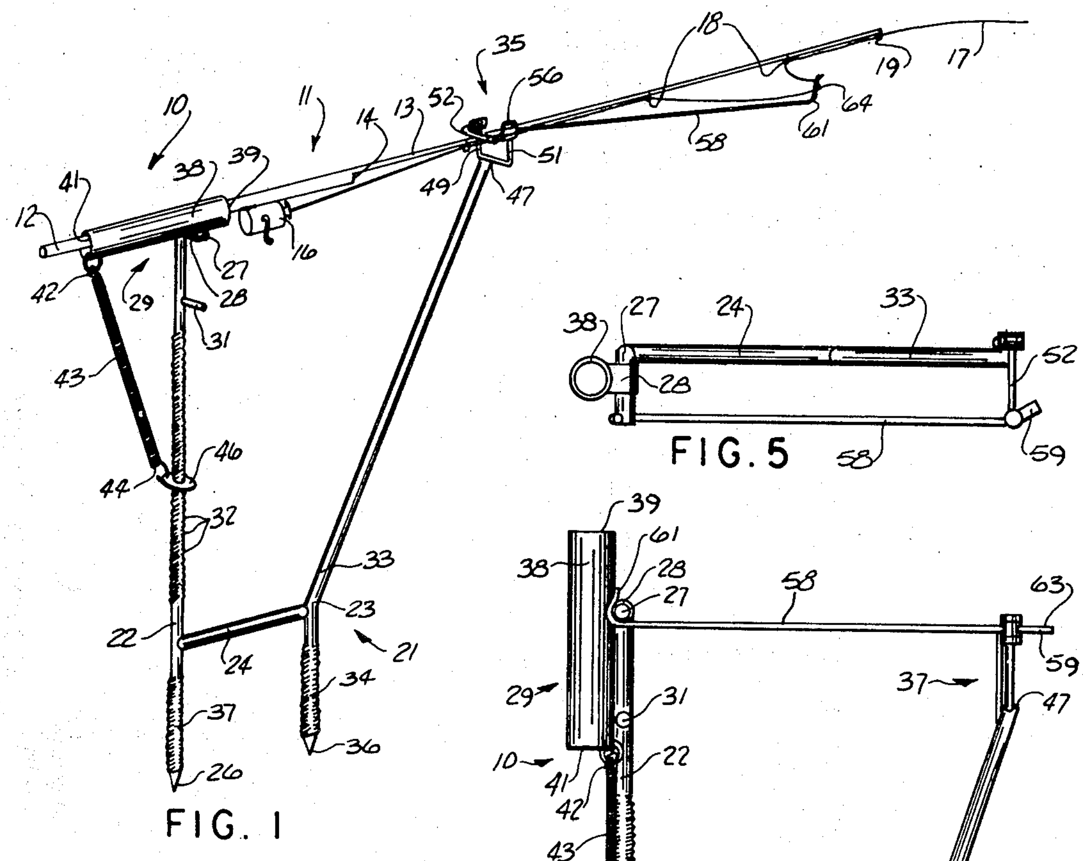
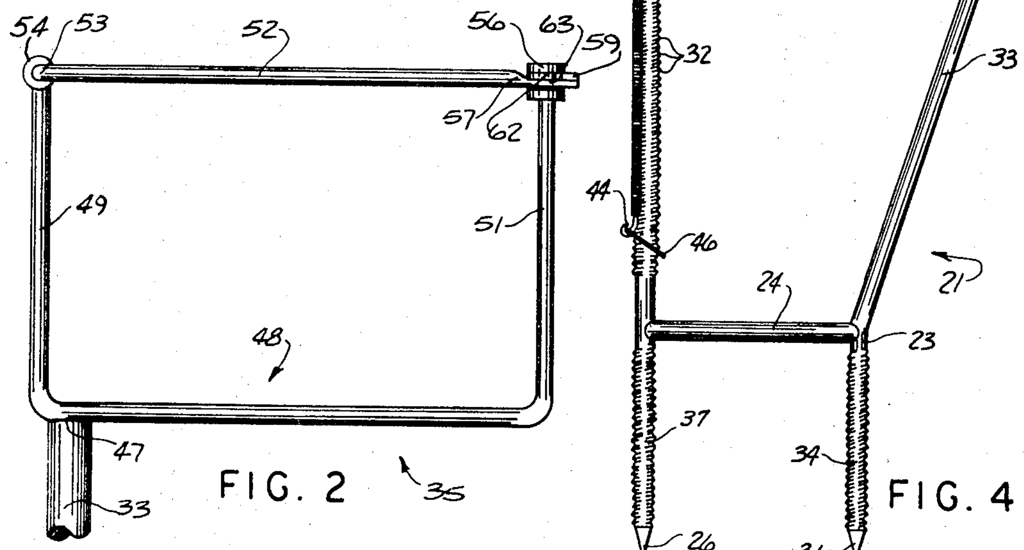
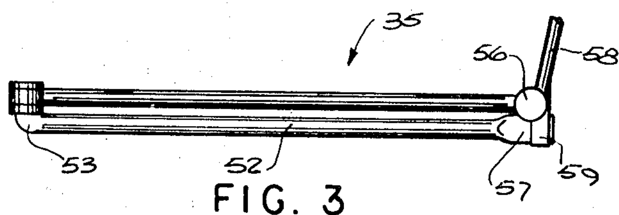
INVENTOR
JOHNY O.W. MARTIN
BY Henderson & Strom
ATTORNEYS United States Patent Office 3,562,947

Patented Feb. 16, 1971

3,562,947

FISHING POLE SUPPORT AND HOOK-SETTING APPARATUS

Johny O. W. Martin, R.F.D. 2, Juniata, Nebr. 68955

Filed Dec. 3, 1968, Ser. No. 780,642
Int. Cl. A01k *97/00, 97/12*
U.S. Cl. 43—15 7 Claims

ABSTRACT OF THE DISCLOSURE

A hook-setting apparatus for use with a conventional fishing pole including a fishing pole holder pivotally mounted to a support frame and operable to swing the holder and attached fishing pole in a vertical plane. A spring is connected at one end to the holder and adjustably mounted on the other end to the support frame to bias the holder to a vertical position. An enclosure frame having a pivotable constraining bar is positioned forward of the holder on the support frame to hold the pole in a horizontal position. The bar is held in constraining position by an activating lever pivoted on the enclosure frame. The fishing line is engaged with the lever and when a fish pulls on the line the lever is disengaged from the constraining bar and the pole is swung to a vertical position by the spring to set the hook in the mouth of the fish.

BACKGROUND OF THE INVENTION

This invention relates generally to fishing pole supports and particularly to fishing pole supports which automatically set a fishhook in the mouth of a fish in response to the action of a fish in taking the bait presented thereon.

Fishing pole holders of the type to which the invention relates are intended to support a fishing pole in operative position so that it may be left unattended or at least will not require the constant attention of the fisherman. It is desirable to provide such holders with a means for setting the hook when a fish pulls on the line or strikes the bait in order to hook the fish in much the same manner as when the rod is manipulated by a skilled fisherman.

It has heretofore been proposed to provide hook-setting devices wherein a fishing pole is mounted on the device in such a manner that a sufficient pull on the line may trip a spring mechanism and cause the fishing pole to move in an arc with a force to set the hook. Examples of such devices are illustrated in U.S. Pats. Nos. 2,964,868; 3,007,275; 3,016,648; and 3,170,262.

The major difficulty encountered with the earlier devices resides in the inability of the fisherman to adjust the spring mechanism of the devices such that the hook-setting force and pulling force necessary to trip the mechanism may be varied to more effectively correspond to the size or striking habit of the particular fish sought at the time. The nonadjustability feature of the earlier devices makes the devices unadaptable for use with all sizes of fish. The apparatus of this invention is designed to overcome this difficulty.

SUMMARY OF THE INVENTION

This invention relates to a fishing pole support apparatus for automatically setting a hook in the mouth of a fish striking a baited hook, or the like, attached to a line connected to a fishing pole, the apparatus including a fishing pole holder pivotally connected to a support frame; a spring adjustably mounted to the frame and connected to the holder, the spring having a tension to constantly urge the holder and fishing pole to pivot from a substantially horizontal position to a substantially vertical position, the apparatus further including an enclosure member horizontally aligned with the holder, and connected forward thereof to the frame, the enclosure member having a retainer bar pivotally connected thereto to retain the fishing pole in horizontal position within the enclosure member, the retainer bar opposing the spring tension urging the fishing pole to a vertical position; and an activating lever releasably engaging the retainer bar to retain the fishing pole in a horizontal position, the lever receiving a portion of the line, and the lever pivoting to disengage the retainer bar in response to a pull on the line by a fish sufficient to overcome the tension exerted on the lever by the retainer bar, whereby the spring will swing the holder and fishing pole upwardly to set the hook.

It is an object of this invention to provide an improved fishing pole support.

It is another object of this invention to provide a fishing pole support having a hook-setting device combined therewith responsive to a fish striking a bait or lure appropriately connected to a line of a fishing pole mounted on the support.

It is yet another object of this invention to provide a fishing pole support and hook-setting device wherein the pulling force upon the fishline necessary to activate the device is relative to the force required to set the hook.

It is still another object of this invention to provide a fishing rod support and hook-setting apparatus wherein the hook-setting force is adjustable.

It is an object of this invention to provide an automatic fishhook-setting device that is easily adaptable for use in catching small fish as well as large fish by appropriately adjusting the spring tension upon both the activating mechanism and the hook-setting mechanism.

It is another object of this invention to provide a fishing rod support as hereinbefore described which is adaptable for use on the bank of a body of water as well as in a boat.

It is still another object of this invention to provide a fishing rod support which is compact, economical, simple, and rugged in construction.

These objects and other features and advantages will become readily apparent in referring to the following description when taken in conjunction with the appended drawings.

BRIEF DESCRIPTION OF THE DRAWINGS

FIG. 1 is a perspective view of the support apparatus of this invention showing a conventional fishing pole mounted thereon;

FIG. 2 is an enlarged fragmentary elevational view of the enclosure unit of the apparatus;

FIG. 3 is a fragmentary top view of the enclosure unit;

FIG. 4 is a side elevational view of the support apparatus, showing the apparatus in transport position; and FIG. 5 is a top plan view of the apparatus in transport position.

DESCRIPTION OF THE PREFERRED EMBODIMENT

Referring now to the drawings and particularly to FIG. 1, the fishing pole support apparatus of this invention is indicated generally by the numeral 10 and is shown in operative position relative to a conventional fishing pole 11.

The fishing pole includes an elongated handle 12, a shaft 13 connected to one end 14 of the handle 12 and projecting longitudinally therefrom, a reel 16 attached to the handle 12, and a line 17 connected to the reel 16 and extending therefrom through longitudinally spaced eyelets 18 connected to the shaft 13. The line 17 extends from the tip 19 of the shaft 13 and connects at the distal end thereof to a fishing lure or baited hook (not shown).

The support apparatus 10 (FIGS. 1 and 4) of this invention includes a frame unit 21 for mounting the entire apparatus 10 either to the side of a boat or in the ground. The frame unit 21 includes an upstanding member 22, a vertically inclined member 23 positioned forward of the upstanding member 22 and a horizontally disposed crossbar 24 interconnected between the upstanding member 22 and the inclined member 23.

The upstanding member 22 is an elongated rod having a pointed lower end 26 and a horizontally-disposed rod 27 continuously formed with or connected to the upper end thereof. The horizontal rod 27 is journaled through a sleeve 28 attached to a fishing rod holder 29, as hereinafter described, to pivotally mount the holder 29 to the upstanding member 22. A horizontally-disposed stopper member 31 is vertically spaced below the rod 27 and is connected to the upstanding member 22 to limit the pivotal rotation of the holder 29 about the axis of the rod 27. The upstanding member 22 is formed from concrete reinforcement rod, or the like, and has a plurality of longitudinally spaced serrations 32 formed thereon. The purpose and function of the serrations 32 will be hereinafter described.

The inclined member 23 (FIGS. 1 and 4) is an angled bar having an upper portion 33 and a lower portion 34. The lower portion 34 extends parallel to the upstanding member 22 and includes a pointed lower end 36. The upper portion 33 of the inclined member 23 is forwardly inclined relative to the lower portion 34 thereof and extends upwardly therefrom to connect to an enclosure unit 35, as hereinafter defined.

To mount the frame unit 21 (FIGS. 1 and 4) in the ground, the lower pointed ends 26 and 36 of the upstanding member 22 and the inclined member 23, respectively, are thrust into the ground, which mounting may be facilitated by applying foot pressure to the crossbar 24. To mount the frame unit 21 to a boat, either of the lower portions 34 or 37 of the inclined member 23 and the upstanding member 22, respectively, may be axially mounted in an oarlock or the like (now shown) mounted to the side of a boat.

The fishing pole holder 29 (FIGS. 1 and 4) includes a tubular member 38 having a sleeve 28 attached thereto near the forward end 39 and normal of the longitudinal axis thereof. The sleeve 28 pivotally mounts the holder 29 to the upstanding member 22 so as to pivot the holder 29 in a substantially vertical plane as hereinbefore described.

The tubular member 38 is adapted to axially receive and loosely embrace the handle 12 of the fishing pole 11 when the axis of the tubular member 38 and fishing pole are substantially identical, and to securely engage the handle 12 when the fishing pole 11 is tilted from the axis of the tubular member 38.

The rearward end 41 (FIGS. 1 and 4) of the tubular member 38 is connected to one end 42 of an elongated spring 43. The other end 44 of the spring 43 is affixed to a circular ring 46 which is slidably mounted on the upright member 22 and frictionally engages the serrations 32 formed thereon. When the holder 29 is pivoted so as to assume a horizontal position, the spring 43 is stretched so as to have a tension which constantly urges the holder 29 to resume a vertical position. The tension of the spring 44 may be selectively adjusted by sliding the ring 46 vertically upon the upstanding member 22 such that a high placement of the ring 46 upon the upstanding member 22 results in a low tension, while a low placement results in a high tension.

To retain the fishing pole 11 mounted in the holder 29 in a substantially horizontal position, an enclosure unit 35 (FIGS. 2 and 3) is provided. The enclosure unit 35 is horizontally aligned with the tubular member 38 (FIG. 1) in horizontal position and is connected to the upper end 47 of the inclined member 21 forward of the holder 29.

The enclosure unit 35 (FIGS. 1, 2 and 3) includes a U-shaped member 48 having a pair of uprights 49 and 51 adapted to laterally confine the shaft 13 of the fishing pole 11. A retainer bar 52 is pivotally connected at one end 53 to the end 54 of the upright 49 and is pivotal in a vertical plane normal of the horizontally-disposed fishing pole 11. The retainer bar 52 is swingable arcuately and extends between the ends 54 and 56 of the uprights 49 and 51, respectively, when horizontally disposed to vertically confine the fishing pole shaft 13 within the enclosure unit 35.

The shaft 13 of the fishing pole 11 (FIGS. 1 and 2) traverses the enclosure unit 35 and is contiguous with the retainer bar 52 in horizontal position owing to the tension of the spring 43 acting upon the tubular member and thus urging the fishing pole 11 toward a vertical position. The tension acting upon the shaft 13 is transmitted to the bar 52, such that when the extended end 57 of the bar 52 is released, as hereinafter described, the bar 52 swings upwardly, releasing the shaft 13 and the fishing pole 11 assumes a vertical position.

An elongated activating lever 58 (FIGS. 1 and 3) is pivotally connected to the end 56 of the upright 51 to releasably engage the extended end 57 of the retainer bar 52 and retain the bar 52 in a confining horizontal position. The lever 58 is pivotal in a horizontal plane about the axis of the upright 51, and includes a short, flattened portion 59 at one end and an upwardly-extending hooked portion 61 at the opposite end thereof.

The flattened portion 39 (FIGS. 2 and 3) is vertically aligned above the extended end 57 of the horizontally disposed retainer bar 52 and is adapted to frictionally engage the upper surface 62 of the bar end 57. The upward force acting upon the retainer bar 52 transmitted thereto by the fishing pole shaft 13 (FIG. 1) determines the amount of friction acting upon the engaging surfaces 62 and 63 of the retainer bar end 57 and the flattened end 59 of the lever 58, respectively.

The hooked portion 61 (FIG. 1) of the lever 58 is adapted to receive a portion 64 of the line 17, whereby a pull on the line 17 sufficient to overcome the frictional engagement of the surfaces 62 and 63 of the retainer bar 52 and lever 58, respectively, will swing the hooked portion 61 inwardly toward the fishing pole 11, thereby swinging the flattened portion 59 outwardly to disengage the retainer bar 52. In transport position (FIG. 4) the hooked portion 61 of the lever 58 connects the rod 27 to the enclosure 35 and serves as a handle to carry the apparatus 10.

To operate the support apparatus 10 of this invention, the lower portions 34 and 37 of the frame unit 21 are thrust into the ground with the inclined member 23 facing the general area to be fished. The bait or lure is then cast to the area to be fished and the handle 12 of the fishing pole 11 is axially mounted in the holder 29 which is in a vertical position as best illustrated in FIG. 4. The mounted fishing pole 11 is then tilted forward to a horizontal position (FIG. 1) which simultaneously exerts a tension upon the spring 43. The horizontally-disposed shaft 13 of the fishing pole 11 is positioned between the enclosure uprights 49 and 51 and the retainer bar 52 is swung to a horizontal position. The activating lever 58 is pivoted such that the flattened end 59 thereof is vertically aligned above the extended end 57 of the retainer bar 52. The fishing pole shaft 13 is then released to contact the retainer bar 52 to transmit an upward force thereto, the upward force being relative to the tension on the spring 43 acting upon the shaft 13 to urge the fishing pole to a vertical position. The upward force upon the retainer bar 52 acts to frictionally engage the vertically-aligned retainer bar end 57 and flattened lever end 59.

A portion 64 of the line 17 is then strung from the shaft 13 to the extended hook portion 61 of the lever 58, such that a pull on the line 17 sufficient to overcome the frictional engagement of the retainer bar 52 with the lever 58 will pull the hooked portion 61 inwardly toward the fishing pole 11. As the hooked portion 61 swings inwardly, the flattened end 59 swings outwardly, disengaging the retainer bar 52. The disengaged retainer bar 52 swings upwardly and releases the confined fishing pole 11, whereby the tension of the spring 43 acts to arcuately swing the fishing pole 11 to a vertical position, thereby causing a sudden pull to the line 17 and hook (not shown) connected thereto to hook the fish. The engagement of the tubular member 38 with the stopper member 31 prevents the fishing pole 11 from swinging beyond a vertical position.

Selectively adjusting the tension upon the spring 43 adapts the apparatus for use with all sizes of fish. To illustrate, when fishing for fish of the panfish variety, the hook-setting motion should not be so strong as to rip the hook from the mouth of the fish nor should the force necessary to pull the line 17 to release the confined fishing pole 11 be so great that the tug by a small fish cannot overcome the friction between ends 57 and 59 to release the fishing pole 11, thus setting the hook. Conversely, a larger fish, such as a pike, requires more force to set the hook. The activating lever 58 should likewise be less sensitive to require the pike to strike the bait harder to release the fishing pole 11 to set the hook.

FIGS. 4–5 disclose the apparatus in transport position, wherein the outer end 61 of the activating lever 58 is pivoted around to engage rod 27 on the upper end of the upstanding member 22. In this position, the activating lever 58 ties the apparatus together and provides a carrying handle therefor.

While the preferred embodiment of this invention has been hereinbefore fully described, it is to be remembered that various alterations and modifications can be made thereto without departing from the invention as defined in the appended claims.

I claim:

1. An improved fishing rod support and hook setting apparatus for use with a fishing pole having a handle, a reel on the handle, a projecting shaft, and a fish line connected at one end to the reel and having the other end thereof projecting outwardly of the shaft, the apparatus comprising:

- a frame unit having a first upstanding member, a second upstanding member spaced apart from said first upstanding member and a horizontally disposed post interconnected therebetween, wherein the lower ends of said members are adapted to be releasably secured to a base for supporting said members in an upright position;
- a holder pivotally mounted on said first upstanding member for holding the fishing pole;
- a spring interconnected between said holder and said first upstanding member and operable to urge said holder to pivot from a substantially horizontal position to a substantially vertical position;
- enclosure means connected to said second upstanding member and substantially horizontally aligned with said holder, said enclosure means having a retainer bar pivotally connected thereto, wherein said bar is operable to releasably retain the fishing pole in a substantially horizontal position; and
- an activating lever pivotally connected to said enclosure means, one end of said lever releasably engaging said bar to hold the fishing pole in said horizontal position, the other end of said activating lever projecting outwardly from the pole shaft and having a hook formed therein to receive a portion of the fish line, whereby upon exertion of a pull on the fish line, said lever pivots to release said bar wherein said holder and fishing pole are pivoted to said substantially vertical position.

2. An improved fishing pole support apparatus as defined in claim 1 wherein said first upstanding member has a plurality of serrations formed thereon, and one end of said spring is connected to a ring member which is movably mounted on said first upstanding member and retainable in a preselected position by any one of said serrations, thus enabling the tension on said spring to be selectively adjusted.

3. An improved fishing pole support apparatus as defined in claim 2, wherein said holder includes a tube adapted to axially receive the handle of the fishing pole, whereby said tube securely engages the handle when the fishing pole is tilted from the axis of said tube.

4. An improved fishing pole support apparatus as defined in claim 3, wherein said enclosure means includes a U-shaped member, said retainer bar pivotally connected to one end of said U-shaped member and swingable arcuately in a vertical plane.

5. An improved fishing pole support apparatus as defined in claim 4, and further wherein the projecting shaft of the fishing pole traverses said U-shaped member when the fishing pole is in a horizontal position, the confined projecting shaft constantly contacting said retainer bar and transmitting said spring tension thereto, thus urging said retainer bar to pivotally swing to release the confined projecting fishing pole shaft.

6. An improved fishing pole support apparatus as defined in claim 5, wherein said activating lever is pivotally connected to the second end of said U-shaped member and is pivotal in a horizontal plane, said retainer bar engaging the underside of one end of said lever and transmitting said transmitted spring tension thereto, said lever pivotal to disengage said retainer bar in response to a pull on the fish line sufficient to overcome said transmitted spring tension upon said lever.

7. An improved fishing pole support apparatus as defined in claim 6, wherein said activating lever other end is releasably attachable to said first upstanding member, thus providing a carrying handle when attached to said first upstanding member.

References Cited

UNITED STATES PATENTS

| | | | |
|---|---|---|---|
| 2,804,277 | 8/1957 | Kinder | 43—16X |
| 2,810,981 | 10/1957 | Littau | 43—16 |
| 2,851,812 | 9/1958 | Beck | 43—15 |

SAMUEL KOREN, Primary Examiner

D. J. LEACH, Assistant Examiner